United States Patent
Gu et al.

(10) Patent No.: US 12,134,158 B2
(45) Date of Patent: Nov. 5, 2024

(54) ELECTRO-HYDRAULIC COMBINED SYSTEM USED FOR ELECTRO MACHINING AND SUPPORTING AUTOMATIC TOOL CHANGING

(71) Applicant: Shanghai Jiao Tong University, Shanghai (CN)

(72) Inventors: Lin Gu, Shanghai (CN); Guojian He, Shanghai (CN)

(*) Notice: Subject to any disclaimer, the term of this patent is extended or adjusted under 35 U.S.C. 154(b) by 379 days.

(21) Appl. No.: 17/528,281

(22) Filed: Nov. 17, 2021

(65) Prior Publication Data
US 2022/0176505 A1   Jun. 9, 2022

(30) Foreign Application Priority Data
Nov. 18, 2020   (CN) .......................... 202011293236.0

(51) Int. Cl.
*B23H 7/26*   (2006.01)
*B23H 1/02*   (2006.01)
(Continued)

(52) U.S. Cl.
CPC .............. *B23Q 3/1554* (2013.01); *B23H 1/02* (2013.01); *B23H 1/10* (2013.01); *B23H 2400/00* (2013.01);
(Continued)

(58) Field of Classification Search
CPC .............. B23Q 3/155–3/15793; B25J 15/0491
(Continued)

(56) References Cited

U.S. PATENT DOCUMENTS 4,563,800 A * 1/1986 Bonga ................ B23Q 3/15506
                                                    408/35
4,596,066 A * 6/1986 Inoue ...................... B23H 7/26
                                                    219/69.15
(Continued)

FOREIGN PATENT DOCUMENTS

CN    102091839 A  *  6/2011
CN    104339056 A  *  2/2015
(Continued)

OTHER PUBLICATIONS

Machine Translation of CN 208743863 U, which CN '863 was published Apr. 2019.*

*Primary Examiner* — Erica E Cadugan
(74) *Attorney, Agent, or Firm* — Jerold I. Schneider; SCHNEIDER IP LAW (57) ABSTRACT

An electro-hydraulic joint supplying system for electrical machining and supporting automatic tool changing includes an electro-hydraulic joint supplying device and a clamping device. The electro-hydraulic joint supplying device includes an insulator, an electro-hydraulic joint supplying base, an electro-hydraulic joint supplying pipe terminal, and an electro-hydraulic joint supplying pipe. The base is fixedly connected with a spindle shell through the insulator. A working fluid pipe connector and a wiring post are arranged on the base; a terminal connector is in a snap-fit with a top end of the electro-hydraulic joint supplying pipe terminal. The pipe terminal communicates with a flushing fluid container in an electrical machining electrode shank through an electro-hydraulic joint supplying pipe. The clamping device includes a first clamping mechanism, a second clamping mechanism, and a cooperation mechanism fixedly connected with the first clamping mechanism or the second clamping mechanism to circumferentially limit the flushing fluid container.

7 Claims, 7 Drawing Sheets

(51) Int. Cl.
  *B23H 1/10* (2006.01)
  *B23H 5/04* (2006.01)
  *B23Q 3/155* (2006.01)

(52) U.S. Cl.
  CPC .................... *B23H 2500/00* (2013.01); *B23Q 2003/155411* (2016.11); *Y10S 483/902* (2013.01); *Y10T 483/17* (2015.01); *Y10T 483/1882* (2015.01)

(58) Field of Classification Search
  USPC ...................................................... 219/68–70
  See application file for complete search history.

(56) References Cited

U.S. PATENT DOCUMENTS

| | | | | |
|---|---|---|---|---|
| 4,996,762 A | * | 3/1991 | Takayama | B23Q 39/02 219/69.11 |
| 6,183,653 B1 | | 2/2001 | Yoshida | |
| 6,740,839 B1 | * | 5/2004 | Kung | B23Q 1/72 219/69.11 |
| 11,794,264 B2 | * | 10/2023 | Gu | B23H 1/10 |
| 2008/0135418 A1 | * | 6/2008 | Yuan | B23H 7/36 29/428 |
| 2012/0285820 A1 | * | 11/2012 | Li | B23H 9/14 204/242 |
| 2015/0328705 A1 | * | 11/2015 | Yang | B23H 9/14 219/69.15 |
| 2020/0238414 A1 | * | 7/2020 | Gu | B23K 9/32 |

FOREIGN PATENT DOCUMENTS

| | | | |
|---|---|---|---|
| CN | 205166084 U | * | 4/2016 |
| CN | 208743863 U | * | 4/2019 |
| CN | 110653435 A | * | 1/2020 |
| CN | 215238445 U | * | 12/2021 |
| CN | 215239709 U | * | 12/2021 |
| CN | 215545661 U | * | 1/2022 |
| EP | 0048457 A2 | * | 3/1982 |
| JP | 56-139835 A | * | 10/1981 |

\* cited by examiner

ELECTRO-HYDRAULIC COMBINED SYSTEM USED FOR ELECTRO MACHINING AND SUPPORTING AUTOMATIC TOOL CHANGING

CROSS REFERENCE TO RELATED APPLICATION

This patent application claims the benefit and priority of Chinese Patent Application No. 202011293236.0 filed on Nov. 18, 2020.

TECHNICAL FIELD

The present disclosure relates to the technical field of electrical machining, in particular to an electro-hydraulic joint supplying system for electrical machining and supporting automatic tool changing.

BACKGROUND ART

Electrical machining includes electrical discharge machining and electric arc machining. It is a thermal erosion process that relies on the high temperature of plasma generated by direct discharge between the anode and cathode. The electrode does not contact the workpiece during machining. Electrical machining is a nontraditional machining method that is widely used in mold, aerospace, and other industries. The working fluid is dielectric or low electrical conductive liquid. The plasma extinguishes during the pulse interval, and the working fluid restored to an insulated or high-resistance state. Therefore, power supplying, electrodes, and flushing fluid are necessary conditions for electrical machining.

The electric arc machining efficiency is extremely high. The efficiency of machining difficult-to-cut materials is three or more times that of traditional cutting, but the surface quality of the machined materials cannot meet the final requirement, so the machined materials often need to be machined subsequently. Therefore, the allowance of the surface subjected to electrical machining needs to be finally removed by machining. If "electrical machining first and then cutting" can be realized in one set of equipment, the time for machine tool changing and re-clamping can be saved, and the machining accuracy can be improved. This requires that an electrode clamping tool of electrical machining and a shank of a cutting tool can be interchanged with each other, that is, providing the same spindle connector. It is not difficult to realize a universal connector and interchangeability of an electrode clamping shank and a machining shank. However, the manufacturing industry will be inevitably developed towards automatic and unmanned factories in the future. This requires that the electrode clamping shank (including electrodes) needs to have an automatic tool changing function. Since a flushing fluid container in an existing electrical machining electrode shank is in rotatable fit with a rotating shaft, the flushing fluid container in the existing electrical machining electrode shank rotates relative to the rotating shaft and the electrodes in a tool changing process, resulting in a problem that automatic tool changing cannot be realized conveniently.

There are two working fluid supply solutions at present: (1) a spindle with a central flushing function is directly used so that working fluid directly reaches an electrode flushing hole; however, in this solution, due to the aperture restriction of a spindle flushing hole, the flow rate is often insufficient, so this solution can be only backup; (2) a flushing pipe is disposed outside the electrode shank alone to realize a large flow rate; however, the flushing pipe in this solution needs to be removed manually. No one has proposed how to realize automation. In an existing power supplying solution, a power connector also needs to be removed during changing of the electrodes or the electrode shank. At present, in the process of changing the shank, a flushing component and a conductive component must be manually mounted or removed and cannot be automatically changed, thus affecting the machining efficiency and increasing the workload of an operator.

SUMMARY

The present disclosure aims to provide an electro-hydraulic joint supplying system for electrical machining and supporting automatic tool changing, so as to solve the problems in the existing art. The electro-hydraulic joint supplying system realizes electro-hydraulic combination, supports automatic tool changing, and improves the tool changing efficiency of electrical machining and the automation degree of machining.

To achieve the above-mentioned purpose, the present disclosure provides the following solution.

It is provided an electro-hydraulic joint supplying system for electrical machining and supporting automatic tool changing. The system includes an electro-hydraulic joint supplying device and a clamping device. The electro-hydraulic joint supplying device includes an insulator, an electro-hydraulic joint supplying base, an electro-hydraulic joint supplying pipe terminal, and an electro-hydraulic joint supplying pipe. The insulator is fixedly connected with a spindle shell or a spindle seat of a machine tool spindle. A top end of the electro-hydraulic joint supplying base is fixedly connected with the insulator. A working fluid pipe connector and a wiring post are arranged on the electro-hydraulic joint supplying base. A bottom end of the electro-hydraulic joint supplying base is provided with a terminal connector; the working fluid pipe connector and the terminal connector each communicate with a runner/fluid runner channel in the electro-hydraulic joint supplying base. When the terminal connector is in a snap-fit with a top end of the electro-hydraulic joint supplying pipe terminal, the runner/fluid runner channel in the electro-hydraulic joint supplying base communicates with a runner/fluid runner channel in the electro-hydraulic joint supplying pipe terminal. The runner/fluid runner channel in the electro-hydraulic joint supplying pipe terminal further communicates with a flushing fluid container in an electrical machining electrode shank through the electro-hydraulic joint supplying pipe. The wiring post, the electro-hydraulic joint supplying base, the electro-hydraulic joint supplying pipe terminal, the electro-hydraulic joint supplying pipe, and the electrical machining electrode shank are all electrically conducted. The electrical machining electrode shank and the spindle are insulated from each other. The clamping device includes a first clamping mechanism arranged at a clamping end of a tool changing mechanical arm and a second clamping mechanism arranged on a base clamping unit of a tool magazine. The first clamping mechanism or the second clamping mechanism is fixedly connected to a cooperation mechanism on an outer side wall of the flushing fluid container to circumferentially limit the flushing fluid container.

In some embodiments, the first clamping mechanism includes two tool changing arm limit forks arranged at the clamping end of the tool changing mechanical arm at an interval; the second clamping mechanism includes two tool changing seat limit forks arranged on the base clamping unit of the tool magazine at an interval. The cooperation mechanism is an electrode limit slot arranged on the outer side wall of the flushing fluid container. The two tool changing arm limit forks or the two tool changing seat limit forks each are simultaneously plugged into the electrode limit slot to circumferentially limit the flushing fluid container.

In some embodiments, the first clamping mechanism is a permanent magnet or an electromagnet arranged at the clamping end of the tool changing mechanical arm; the second clamping mechanism is a permanent magnet or an electromagnet arranged on the tool magazine base clamping unit. The cooperation mechanism is a permanent magnet or an electromagnet fixedly arranged on the outer side wall of the flushing fluid container. Both the first clamping mechanism and the second clamping mechanism each generate a magnetic attractive force with the cooperation mechanism to circumferentially limit the flushing fluid container.

In some embodiments, the spindle shank connector is a standard shank connector; a universal limit slot is formed in an outer side wall of the spindle shank connector. The electrical machining electrode shank and the spindle shank connector are insulated from each other by means of disposing an insulation layer therebetween.

In some embodiments, the working fluid pipe connector is communicated with a working fluid storage device; and working fluid in the working fluid storage device is pumped into the electro-hydraulic joint supplying base through a pressure pump via the working fluid pipe connector. The wiring post is electrically connected with a power supply.

In some embodiments, when the terminal connector is in a snap-fit with the top end of the electro-hydraulic joint supplying pipe terminal, a joint between the terminal connector and the electro-hydraulic joint supplying pipe terminal is sealed.

In some embodiments, a sealing ring or a sealing mechanism is arranged between the terminal connector and the electro-hydraulic joint supplying pipe terminal to prevent the working fluid from leaking, and the sealing ring or the sealing mechanism does not affect direct contact for electric conduction between the terminal connector and the electro-hydraulic joint supplying pipe terminal.

In some embodiments, the working fluid pipe connector, the electro-hydraulic joint supplying base, the terminal connector, the electro-hydraulic joint supplying pipe terminal, the electro-hydraulic joint supplying pipe, and a liquid channel in the electrical machining electrode shank jointly form a working fluid channel.

In some embodiments, the working fluid pipe connector, the electro-hydraulic joint supplying base, the terminal connector, the electro-hydraulic joint supplying pipe terminal, the electro-hydraulic joint supplying pipe, the electrical machining electrode shank, and an electrode jointly form an electric conduction channel.

Compared with the existing art, the following technical effects are achieved in the present disclosure.

The electro-hydraulic joint supplying system for electrical machining and supporting automatic tool changing of the present disclosure realizes electro-hydraulic joint supply and supports automatic tool changing, thus improving the tool changing efficiency of electrical machining. In the electro-hydraulic joint supplying system for electrical machining and supporting automatic tool changing of the present disclosure, the electro-hydraulic joint supplying pipe terminal and the electro-hydraulic joint supplying base are in a snap-fit with each other, thereby realizing a rapid plug-in fit. Furthermore, after switching on, the electro-hydraulic joint supplying pipe provides an auxiliary support, thus improving the rigidity and accuracy of the system. By means of matching the tool changing arm limit forks and the tool changing seat limit forks with the electrode limit slot on the outer wall of the flushing fluid container, an angle formed between the rotating shaft inside the electrode shank and the flushing fluid container outside the electrode shank is kept constant before and after the tool changing, thus avoiding a failure of plugging into a port due to their relative rotation before and after clamping. The electro-hydraulic joint supplying device can further enhance the flushing effect and make machining more stable in addition to providing a connection method for the power supply. The electrode-hydraulic joint supplying device has a compact size and will not affect the cutting function of the existing machine tool. The shank may be very short, which has little impact on an axial stroke (z-directional stroke) of the machine tool, thus greatly ensuring the machining range of the machine tool. Above all, the present disclosure is favorable for realizing an automation-orientated automatic tool changing function, and the electrical machining including the electric arc machining and the electrical machining is highly integrated with the traditional cutting on one machine tool.

BRIEF DESCRIPTION OF THE DRAWINGS

In order to describe embodiments of the present disclosure or technical solutions in the existing art more clearly, drawings required to be used in the embodiments will be briefly introduced below. It is apparent that the drawings in the descriptions below are only some embodiments of the present disclosure. Those of ordinary skill in the art also can obtain other drawings according to these drawings without making creative work.

List of reference signs: 1 spindle shell; 2 insulator; 3 electro-hydraulic joint supplying base; 4 working fluid pipe connector; 5 wiring post; 6: terminal connector; 7 sealing ring; 8: electro-hydraulic joint supplying pipe terminal; 9 spindle shank connector; 10 universal limit slot; 11 hollow rotating shaft; 12 rotating mechanism; 13 electrode limit slot; 14 electrode connector; 15 flushing fluid container; 16 electro-hydraulic joint supplying pipe; 17 electro-hydraulic joint supplying device; 18 tool magazine; 181 tool changing seat limit fork; 19 tool changing mechanical arm; 191 tool changing arm limit fork; and 192 tool claw.

DETAILED DESCRIPTION OF THE EMBODIMENTS

The following clearly and completely describes the technical solution in the embodiments of the present disclosure in combination with the accompanying drawings of the embodiments of the present disclosure. Apparently, the described embodiments are only part of the embodiments of the present disclosure, not all embodiments. Based on the embodiments in the present disclosure, all other embodiments obtained by those of ordinary skill in the art without creative efforts shall fall within the protection scope of the present disclosure.

The present disclosure aims to provide an electro-hydraulic joint supplying system for electrical machining and supporting automatic tool changing, so as to solve the problems in the existing art. The electro-hydraulic joint supplying system achieves electro-hydraulic joint supplier, supports automatic tool changing, and improves the tool changing efficiency of electrical machining and the automation degree of machining.

In order to make the above-mentioned purposes, characteristics and advantages of the present disclosure more obvious and understandable, the present disclosure is further described in detail below with reference to the accompanying drawings and specific implementation modes.

As shown in FIG. 1 to FIG. 5, in the present embodiment, the electro-hydraulic joint supplying system for electrical machining and supporting automatic tool changing includes an electro-hydraulic joint supplying device 17 and a clamping device.

Figure 9:
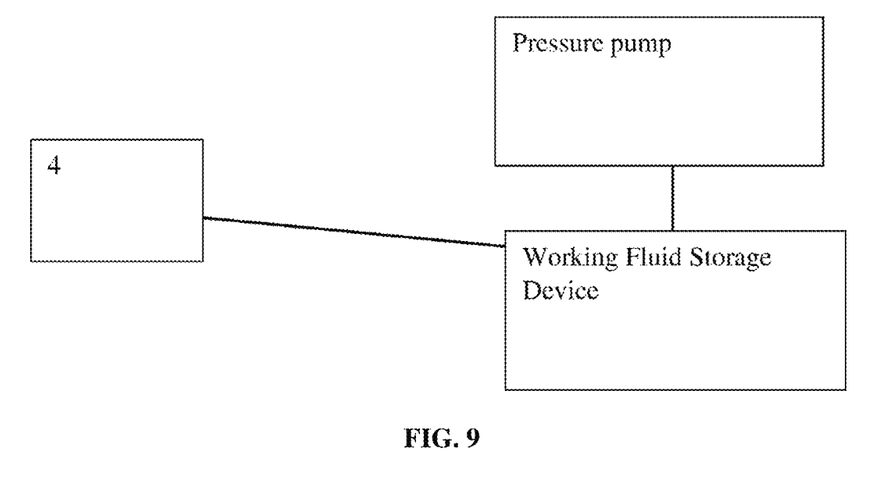
FIG. 9 schematically depicts the functional relationship re the pressure pump, the working fluid storage device, and the working fluid pipe connector.
Figure 10:
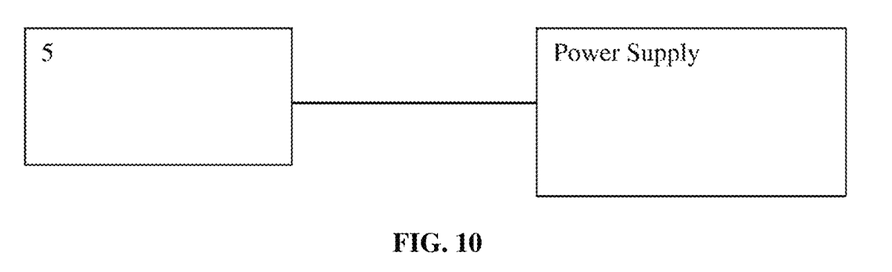
FIG. 10 schematically depicts the relationship between the power supply and the wiring post.

The electro-hydraulic joint supplying device 17 includes an insulator 2, an electro-hydraulic joint supplying base 3, an electro-hydraulic joint supplying pipe terminal 8, and two electro-hydraulic joint supplying pipes 16. The insulator 2 is fixedly connected with a spindle shell 1 of a machine tool spindle. It should be noted that the insulator 2 is only a non-rotatable part on the spindle, such as a spindle seat. A top end of the electro-hydraulic joint supplying base 3 is fixedly connected with the insulator 2. A working fluid pipe connector 4 and a wiring post 5 are arranged on the electro-hydraulic joint supplying base 3; the working fluid pipe connector 4 communicates with a working fluid storage device (as schematically shown in FIG. 9). A pressure pump is arranged on a pipeline between the working fluid pipe connector 4 and the working fluid storage device; and working fluid in the working fluid storage device is pumped into the electro-hydraulic joint supplying base 3 through the working fluid pipe connector 4 via the pressure pump (as schematically shown in FIG. 9). The wiring post 5 is electrically connected with a power supply (as schematically shown in FIG. 10).

A bottom end of the electro-hydraulic joint supplying base 3 is provided with a terminal connector 6; the working fluid pipe connector 4 and the terminal connector 6 respectively communicate with a runner in the electro-hydraulic joint supplying base 3. When the terminal connector 6 is in a snap-fit with a top end of the electro-hydraulic joint supplying pipe terminal 8, the runner in the electro-hydraulic joint supplying base 3 communicates with a runner in the electro-hydraulic joint supplying pipe terminal 8. When the terminal connector 6 is in a snap-fit with the top end of the electro-hydraulic joint supplying pipe terminal 8, a joint between the terminal connector 6 and the electro-hydraulic joint supplying pipe terminal 8 is sealed. A sealing ring 7 is arranged between the terminal connector 6 and the electro-hydraulic joint supplying pipe terminal 8, and the sealing ring 7 does not affect direct contact for electric conduction between the terminal connector 6 and the electro-hydraulic joint supplying pipe terminal 8.

Figure 6:
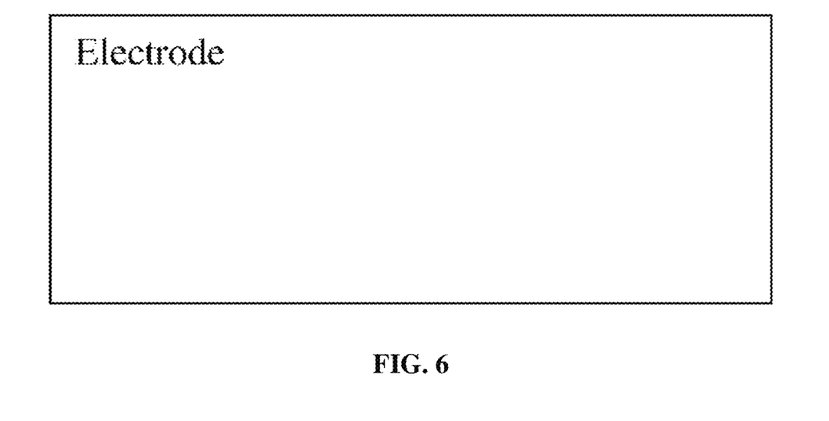
FIG. 6 schematically depicts an electrode.

The runner of the electro-hydraulic joint supplying pipe terminal 8 further communicates with a flushing fluid container 15 in an electrical machining electrode shank through the two electro-hydraulic joint supplying pipes 16. The electrical machining electrode shank includes the flushing fluid container 15, a rotating mechanism 12, a hollow rotating shaft 11, and an electrode connector 14. The hollow rotating shaft 11 is fixedly connected with the spindle through a spindle shank connector 9 and may be driven by the spindle to rotate. An electrode, such as the electrode schematically depicted in FIG. 6, is fixedly connected with a bottom end of the hollow rotating shaft 11 through the electrode connector 14. A liquid guide hole communicating with the flushing fluid container 15 is formed in a side wall of the hollow rotating shaft 11; the liquid guide hole communicates with a runner inside the hollow rotating shaft 11. The runner inside the hollow rotating shaft 11 communicates with the electrode through a working fluid channel in the electrode connector 14 via a shaft end opening. The electrode connector 14 is of a hollow structure, and the working fluid channel and an electrode fixing surface are arranged in the middle; and the electrode is fixed at the bottom end of the hollow rotating shaft 11 by the electrode connector 14. One rotating mechanism 12 is arranged at each of a top end and a bottom end of the flushing fluid container 15; the hollow rotating shaft 11 is in rotatable fit with the flushing fluid container 15 through the two rotating mechanisms 12. The rotating mechanisms 12 seal an upper end and a lower end of the flushing fluid container 15. The rotating mechanisms 12 are sealed itself; the flushing fluid container 15 is connected with outer rings of the rotating mechanisms 12, and the hollow rotating shaft 11 is connected with inner rings of the rotating mechanisms 12; and the two rotating mechanisms 12 respectively seal the upper end and the lower end of the flushing fluid container 15.

The wiring post 5, the electro-hydraulic joint supplying base 3, the electro-hydraulic joint supplying pipe terminal 8, the electro-hydraulic joint supplying pipes 16, the flushing fluid container 15, the rotating mechanism 12, and the hollow rotating shaft 11 are all conductive, and an electrode shank and a spindle shank connector 9 are insulated from each other by means of disposing an insulation layer between the rotating mechanism and the hollow rotating shaft. A universal limit slot 10 is formed in an outer side wall of the spindle shank connector 9, and an electrode limit slot 13 is formed in an outer side wall of the flushing fluid container 15.

The clamping device includes two tool changing arm limit forks 191 arranged at a clamping end of a tool changing mechanism arm 19 at an interval and two tool changing seat limit fork 181 arranged on a base clamping unit of a tool magazine 18 at an interval. It should be noted that two tool changing arm limit forks 191 and one tool claw 192 (referring to FIG. 2) are respectively arranged at the two clamping ends of the tool changing mechanical arm 19; the two tool changing arm limit forks 191 or the two tool changing seat limit forks 181 can be simultaneously plugged into the electrode limit slot in the outer side wall of the flushing fluid container to circumferentially limit the flushing fluid container; and the tool claw 192 may be plugged into the universal limit slot 10 to limit the spindle shank connector 9. By means of cooperation between the limit forks on the base clamping unit of the tool magazine 18 as well as the limit forks on the tool changing mechanical arm 19 and the electrode limit slot 13 on the outer wall of the flushing fluid container 15, an angle formed between the hollow rotating shaft 11 and the flushing fluid container 15 below the electrode shank is kept constant before and after the tool changing, thus avoiding a failure of plugging into a port due to their relative rotation before and after clamping.

In the present embodiment, the electro-hydraulic joint supplying base 3 is connected and fixed to the spindle seat or a non-rotatable part on an end surface of the spindle or a side surface through an insulation bottom plate and is kept stationary during electrical machining. The electro-hydraulic joint supplying base 3 is of a hollow structure and is made of a conductive material. The working fluid pipe connector 4 is formed in a side surface or a top surface of the electro-hydraulic joint supplying base 3. The working fluid pipeline is connected with the working fluid pipe connector 4; and during machining, the working fluid enters a channel inside the electro-hydraulic joint supplying base 3 through the working fluid pipe connector 4. The electro-hydraulic joint supplying base 3 is additionally provided with the power wiring post 5; an electrical machining power wire is connected with the wiring post 5; and during machining, an output current of a pulse power supply flows through the entire electro-hydraulic joint supplying base 3 via the wiring post 5. The bottom of the electro-hydraulic joint supplying base 3 is the terminal connector 6 of an electrode clamping shank; the terminal connector 6 is of a hollow structure for allowing the electro-hydraulic joint supplying pipe terminal 8 to be plugged. During mounting of the electrode shank, the electro-hydraulic joint supplying pipe terminal 8 is plugged into the terminal connector 6 to form the working fluid channel and a conduction current. After the electro-hydraulic joint supplying pipe terminal 8 is plugged into the terminal connector 6, under the action of a tool changing mechanism or a manually applied thrust, an outer side surface of the electro-hydraulic joint supplying pipe terminal 8 and an inner surface of the terminal connector 6 are in full contact with each other and generate a pressure, so as to ensure sealing and full-contact electric conduction.

Figure 1:
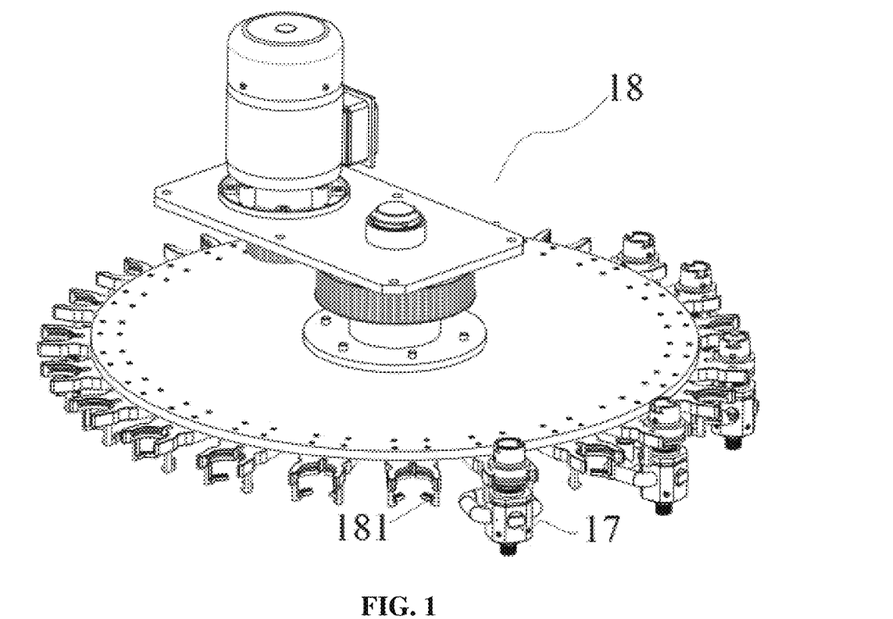
FIG. 1 is a partially schematic structural diagram I of an electro-hydraulic joint supplying system for electrical machining and supporting automatic tool changing according to the present disclosure.
Figure 2:
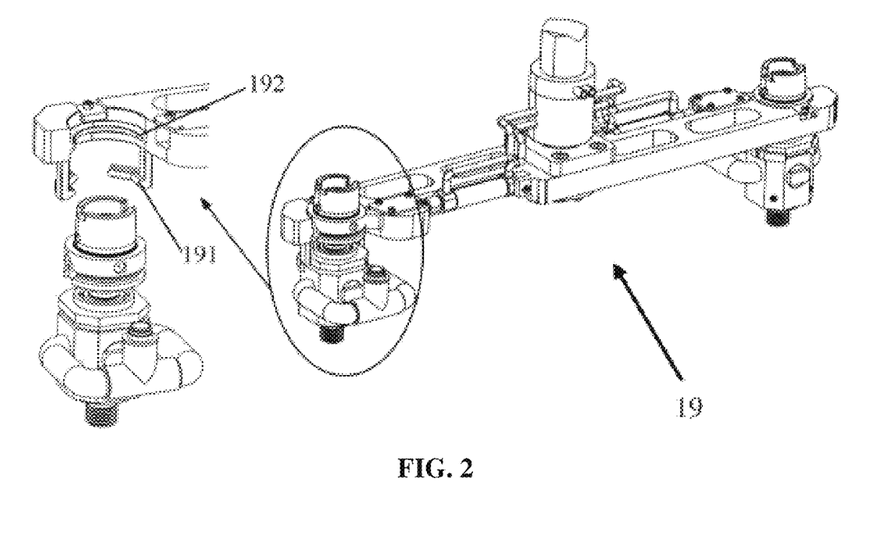
FIG. 2 is a partially schematic structural diagram II of the electro-hydraulic joint supplying system for electrical machining and supporting automatic tool changing according to the present disclosure.
Figure 3:
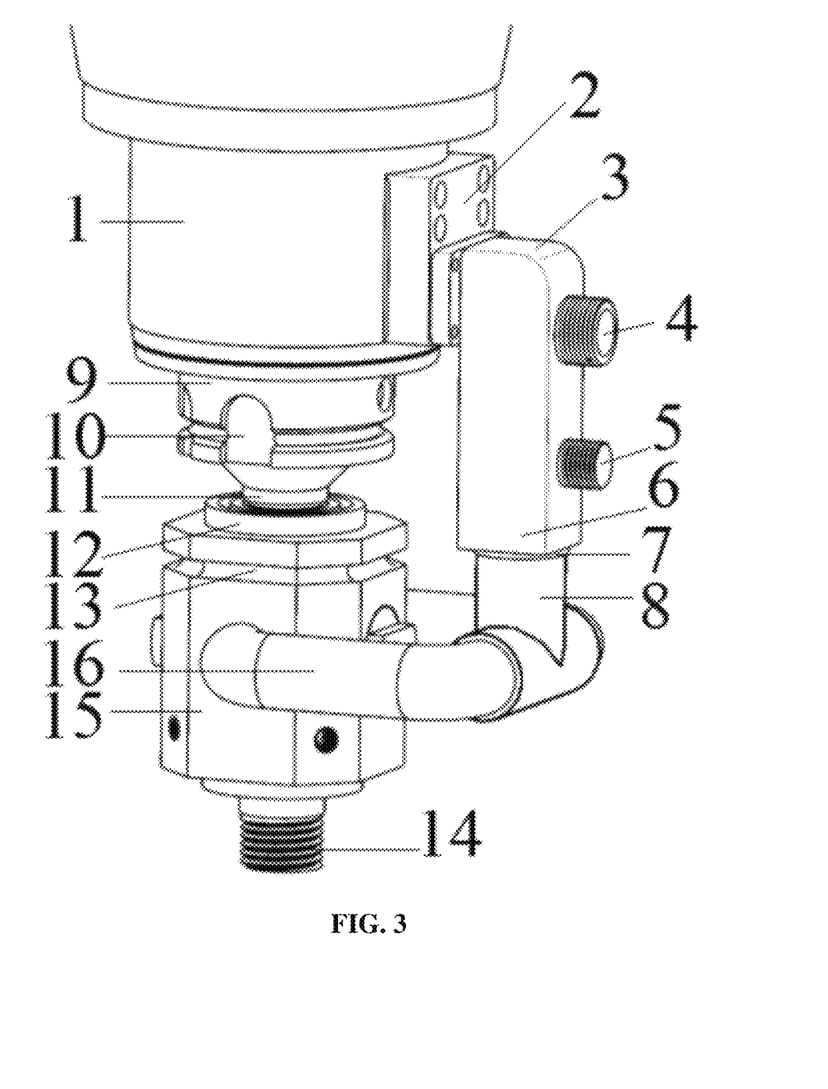
FIG. 3 is a schematic structural diagram I of an electro-hydraulic joint supplying device in the electro-hydraulic joint supplying system for electrical machining and supporting automatic tool changing according to the present disclosure.
Figure 4:
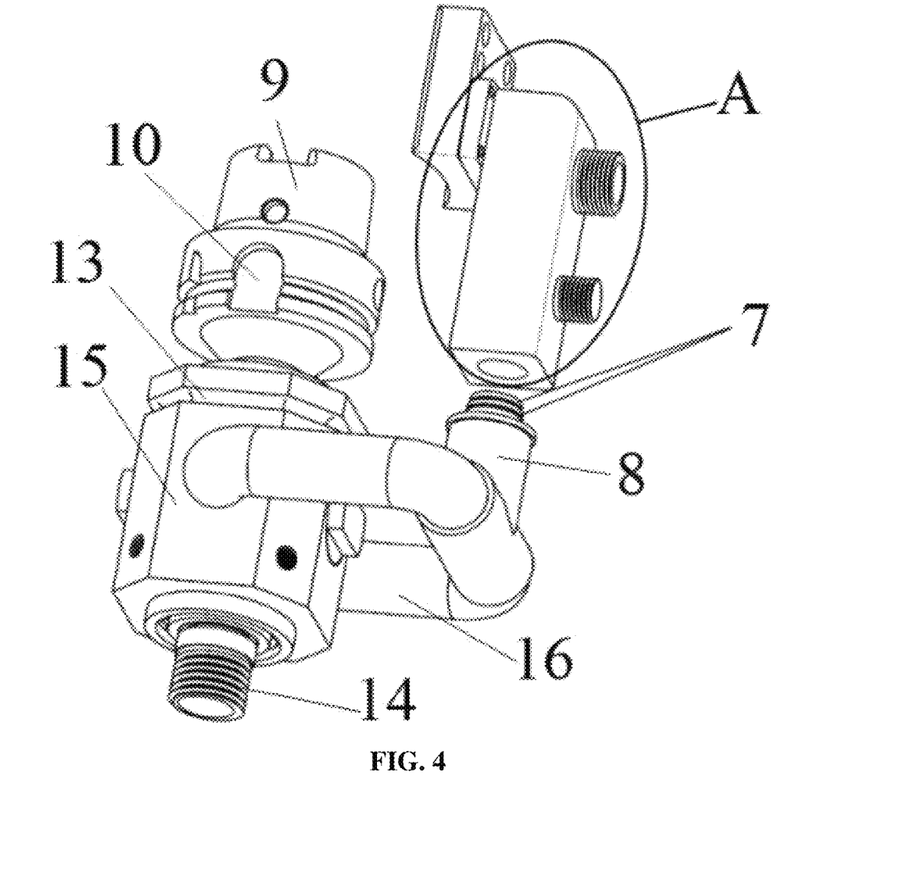
FIG. 4 is a schematic structural diagram II of the electro-hydraulic joint supplying device in the electro-hydraulic joint supplying system for electrical machining and supporting automatic tool changing according to the present disclosure.
Figure 5:
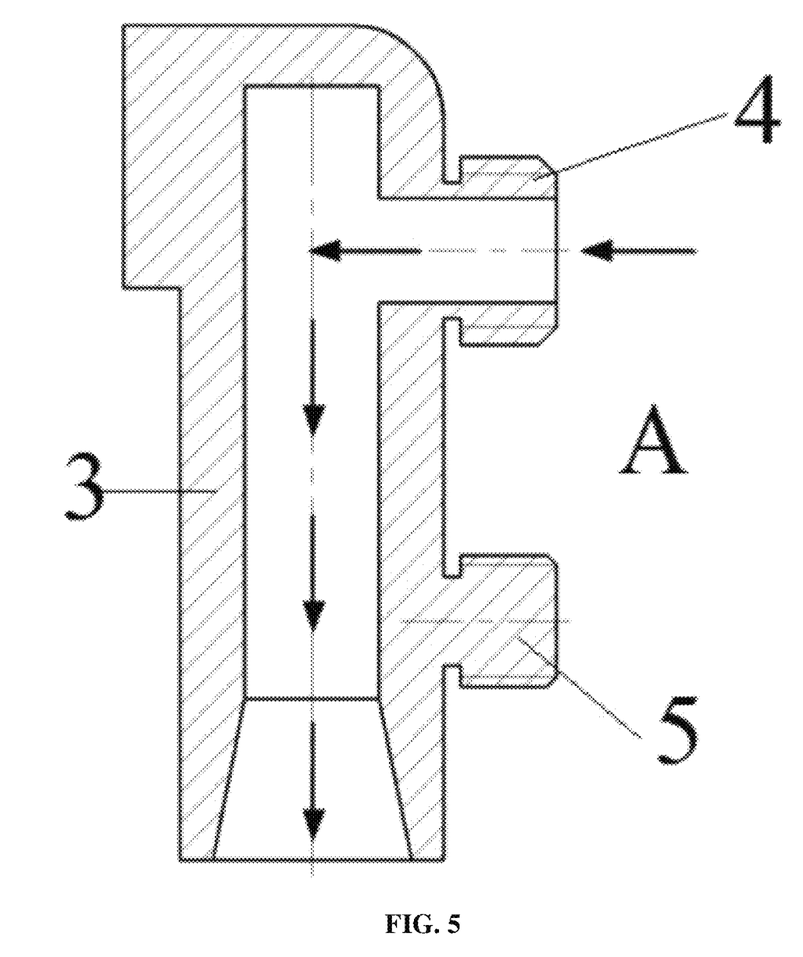
FIG. 5 is a sectional view of the part A in FIG. 4.

An electric conduction channel in the electro-hydraulic joint supplying system for electrical machining and supporting automatic tool changing of the present embodiment is: the wiring post 5 to the electro-hydraulic joint supplying base 3 to the terminal connector 6 to the electro-hydraulic joint supplying pipe terminal 8 to the electro-hydraulic joint supplying pipes 16 to the flushing fluid container 15 to the rotating mechanisms 12 to the hollow rotating shaft 11 to the electrode connector 14 to the electrode. The working fluid channel is: the pressure pump to the working fluid pipe to the working fluid pipe connector 4 to the runner in the electro-hydraulic joint supplying base 3 to the terminal connector 6 to the electro-hydraulic joint supplying pipe terminal 8 to the electro-hydraulic joint supplying pipes 16 to the flushing fluid container 15 to the liquid guide hole in the side wall of the hollow rotating shaft 11 to the channel in the hollow rotating shaft 11 to the electrode connector 14 to the electrode. The arrow in FIG. 5 represents a flowing direction of the working fluid in the electro-hydraulic joint supplying base 3. It should be noted that the flushing fluid container 15 is overall sealed, and the middle part of the hollow rotating shaft 11 is immersed in the working fluid in the flushing fluid container 15, so even if the hollow rotating shaft 11 ceaselessly rotates, the working fluid in the flushing fluid container 15 will also continuously enter the runner in the hollow rotating shaft 11 through the liquid guide hole.

A top end of the electro-hydraulic joint supplying port has a certain taper, which plays an introduction role and facilitates directly fast communication. Furthermore, after the communication, the electro-hydraulic joint supplying pipes 16 provide an auxiliary support, thus improves the rigidity and accuracy of the system.

Figure 7:
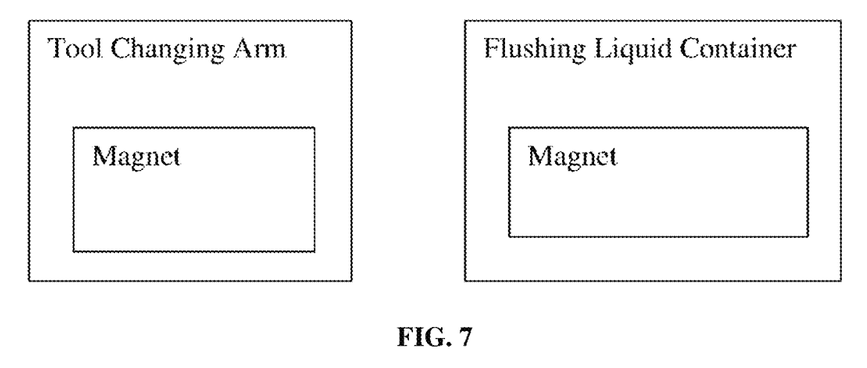
FIG. 7 schematically depicts an alternative embodiment of tool changing arm and flushing liquid container.
Figure 8:
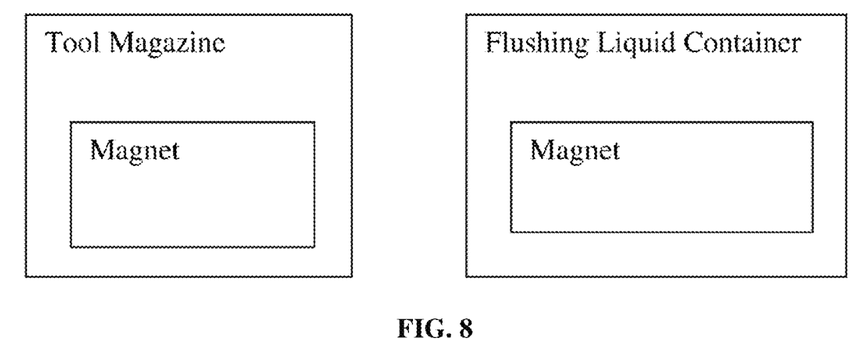
FIG. 8 schematically depicts an alternative embodiment of tool magazine and flushing liquid container.

When it is necessary to change the electrode shank, the tool changing mechanical arm 19 plugs the tool claw 192 of one clamping end in a tool seat of the electrode tool magazine into the universal limit slot 10 of a new electrical machining electrode shank, and plugs the tool changing arm limit forks 191 into the electrode limit slot 13 of the new electrical machining electrode shank. After the tool claw and the tool changing arm limit forks are plugged in place and clamped, the new electrical machining electrode shank is removed. After the spindle rotates to a specified angle, the tool changing mechanical arm 19 plugs the tool claw 192 of the other clamping end into the universal limit slot 10 of an electrical machining electrode shank to be removed and plugs the tool changing arm limit forks 191 into the electrode limit slot 13 of the electrical machining electrode shank to be removed. After the tool claw and the tool changing arm limit forks are plugged in place and clamped, the hollow rotating shaft 11 inside the electrode shank and the flushing fluid container 15 outside the electrode shank are fixed, and the tool changing mechanical arm 19 then executes a tool changing action. The electrical machining electrode shank to be removed (including the flushing fluid container 15, the rotating mechanism 12, the electro-hydraulic joint supplying pipes 16, the electro-hydraulic joint supplying pipe terminal 8, the spindle shank connector 9, the hollow rotating shaft 11, the electrode connector 14, and the electrode) is removed. The tool changing mechanical arm 19 then rotates to move the new electrical machining electrode shank to the center of the spindle connector. Meanwhile, the electro-hydraulic joint supplying pipe terminal 8 is aligned with the terminal connector 6 on the electro-hydraulic joint supplying base 3, and the electrical machining electrode shank is plugged into a spindle connector. The electro-hydraulic joint supplying pipe terminal 8 is plugged to the terminal connector 6 on the electro-hydraulic joint supplying base 3 to complete actions of mounting a tool, switching on a power channel, and communicating the working fluid connector. The tool changing mechanical arm 19 moves to the tool magazine 18; the removed electrical machining electrode shank is conveyed into a tool base; the shank on the tool base is locked, and the tool changing seat limit forks 181 are plugged into the electrode limit slot 13; the tool claws on the tool base clamp the spindle shank connector 9 of the electrical machining electrode shank to keep the hollow rotating shaft 11 inside the electrode shank and the flushing fluid container 15 outside the electrode shank fixed; and finally, the tool changing mechanical arm 19 returns to a waiting position. If an ordinary machining shank is changed, the tool changing arm limit forks 191 of the tool changing mechanical arm 19 still extend out, but are in an idling state, and they do not interfere with the shank. It should be noted that the clamping device in the present embodiment, namely the tool changing arm limit forks 191, the tool changing seat limit forks 181, and the electrode limit slot 13, may also be replaced with a magnetic attraction device as schematically shown in FIGS. 7 and 8; the flushing liquid container 15 is circumferentially limited by a magnetic attractive force; magnetic attraction is realized by an electromagnet or a permanent magnet. For example, each tool changing seat limit fork 181 is replaced with a first electromagnet, each tool changing arm limit fork 191 is replaced with a second electromagnet, and the electrode limit slot 13 is replaced with a permanent magnet; clamping is realized through the attractive fore between the first electromagnet or the second electromagnet and the permanent magnet. This technical solution shall fall within the protection scope of the present disclosure.

The electro-hydraulic joint supplying system for electrical machining and supporting automatic tool changing of the present embodiment can further enhance the flushing effect and make machining more stable in addition to providing a connection method for the power supply. The electrode shank and the electro-hydraulic joint supplying base 3 in the electro-hydraulic joint supplying system used for electrical machining and supporting automatic tool changing of the present embodiment, have compact sizes and will not affect the cutting function of the existing machine tool. The shank may be very short, which has little impact on an axial stroke (z-directional stroke) of the machine tool, thus greatly ensuring the machining range of the machine tool. Above all, the present embodiment is favorable for realizing an automation-orientated automatic tool changing function, and the electrical machining including electric arc machining and the electro machining is highly integrated with the traditional cutting on one machine tool.

In the description of the present disclosure, it should be noted that orientations or positional relationships indicated by the terms "top", "bottom", "inside", "outside", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are construed as limiting the present disclosure.

The principle and implementation modes of the present disclosure are described by applying specific examples in the present specification. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of the specification shall not be deemed as limitations to the present disclosure.

What is claimed is:

1. An electro-hydraulic joint system for electrical machining, which system is configured for supporting automatic tool changing, the system comprising:
an electro-hydraulic joint supplying device for supplying an electro-hydraulic joint; and
a clamping device,
wherein the electro-hydraulic joint supplying device comprises:
an insulator,
an electro-hydraulic joint supplying base,
an electro-hydraulic joint supplying pipe terminal, and
an electro-hydraulic joint supplying pipe;
the insulator is fixedly connected with a spindle shell or with a spindle seat of a machine tool spindle so as to be non-rotatable with respect to the spindle shell or spindle seat;
a top end of the electro-hydraulic joint supplying base is fixedly connected with the insulator;
a working fluid pipe connector and a wiring post are arranged on the electro-hydraulic joint supplying base;
a bottom end of the electro-hydraulic joint supplying base is provided with a terminal connector;
the working fluid pipe connector and the terminal connector each communicate with a fluid runner channel that is in the electro-hydraulic joint supplying base;
when the terminal connector is in a snap-fit with a top end of the electro-hydraulic joint supplying pipe terminal, the fluid runner channel in the electro-hydraulic joint supplying base communicates with a fluid runner channel that is in the electro-hydraulic joint supplying pipe terminal;
the fluid runner channel in the electro-hydraulic joint supplying pipe terminal further communicates with a flushing fluid container of an electrical machining electrode shank via the electro-hydraulic joint supplying pipe;
the wiring post, the electro-hydraulic joint supplying base, the electro-hydraulic joint supplying pipe terminal, the electro-hydraulic joint supplying pipe, and the electrical machining electrode shank are all conductive and configured to conduct electricity;
the electrical machining electrode shank and the spindle are electrically insulated from each other;
the clamping device comprises: (i) a first clamping mechanism arranged at a clamping end of a tool changing mechanical arm, and (ii) a second clamping mechanism arranged on a a tool magazine;
the first clamping mechanism or the second clamping mechanism is selectively fixedly connected to a cooperation mechanism that is on an outer side wall of the flushing fluid container to circumferentially limit the flushing fluid container;
the working fluid pipe connector, the electro-hydraulic joint supplying base, the terminal connector, the electro-hydraulic joint supplying pipe terminal, the electro-hydraulic joint supplying pipe, and a liquid channel in the electrical machining electrode shank jointly form a working fluid channel;
the wiring post, the electro-hydraulic joint supplying base, the terminal connector, the electro-hydraulic joint supplying pipe terminal, the electro-hydraulic joint supplying pipe, the electrical machining electrode shank, and an electrode attached to the electrical machining electrode shank jointly form an electric conduction channel; and
the electro-hydraulic joint supplying device is simultaneously configured as the working fluid channel and the electric conduction channel.

2. The electro-hydraulic joint system for electrical machining and supporting automatic tool changing according to claim 1, wherein
the first clamping mechanism comprises two tool changing arm limit forks arranged at the clamping end of the tool changing mechanical arm at an interval;
the second clamping mechanism comprises two tool changing seat limit forks arranged on the tool magazine at an interval;
the cooperation mechanism is a limit slot arranged on the outer side wall of the flushing fluid container; and
each of the two tool changing arm limit forks or each of the two tool changing seat limit forks are simultaneously plugged into the limit slot to circumferentially limit the flushing fluid container.

3. The electro-hydraulic joint system for electrical machining and supporting automatic tool changing according to claim 1, wherein
the first clamping mechanism is a magnet arranged at the clamping end of the tool changing mechanical arm;
the second clamping mechanism is a magnet arranged on the tool magazine;
the cooperation mechanism is a magnet fixedly arranged on the outer side wall of the flushing fluid container; and
both the first clamping mechanism and the second clamping mechanism each generate a magnetic attractive force with the cooperation mechanism to circumferentially limit the flushing fluid container.

4. The electro-hydraulic joint system for discharge machining and supporting automatic tool changing according to claim 1, wherein
the electrical machining electrode shank is fixedly connected to the spindle via a spindle shank connector;
a limit slot is formed in an outer side wall of the spindle shank connector; and
the electrical machining electrode shank and the spindle shank connector are electrically insulated from each other by means of disposing an insulation layer therebetween.

5. The electro-hydraulic joint system for electrical machining and supporting automatic tool changing according to claim 1, wherein
the working fluid pipe connector is communicated with a working fluid storage device; and
working fluid in the working fluid storage device is pumped into the electro-hydraulic joint supplying base via a pressure pump and via the working fluid pipe connector; and
the wiring post is electrically connected with a power supply.

6. The electro-hydraulic joint system for electrical machining and supporting automatic tool changing according to claim 5, wherein
a sealing ring is arranged between the terminal connector and the electro-hydraulic joint supplying pipe terminal to prevent the working fluid from leaking, and
wherein electric conduction between the terminal connector and the electro-hydraulic joint supplying pipe terminal is provided, despite the presence of the sealing ring.

7. The electro-hydraulic joint system for electrical machining and supporting automatic tool changing according to claim 1, wherein when the terminal connector is in a snap-fit with the top end of the electro-hydraulic joint supplying pipe terminal, a joint between the terminal connector and the electro-hydraulic joint supplying pipe terminal is sealed.

* * * * *